(12) United States Patent
Dolph (10) Patent No.: US 9,281,991 B2
(45) Date of Patent: *Mar. 8, 2016

(54) MEDIA STREAMING

(71) Applicant: International Business Machines Corporation, Armonk, NY (US)

(72) Inventor: Blaine H. Dolph, Western Springs, IL (US)

(73) Assignee: International Business Machines Corporation, Armonk, NY (US)

( * ) Notice: Subject to any disclaimer, the term of this patent is extended or adjusted under 35 U.S.C. 154(b) by 156 days.

This patent is subject to a terminal disclaimer.

(21) Appl. No.: 14/044,985

(22) Filed: Oct. 3, 2013

(65) Prior Publication Data

US 2014/0040436 A1    Feb. 6, 2014

Related U.S. Application Data

(63) Continuation of application No. 12/985,372, filed on Jan. 6, 2011, now Pat. No. 8,583,817.

(51) Int. Cl.
*H04L 29/06* (2006.01)
*H04N 21/2343* (2011.01)
*H04N 21/2368* (2011.01)
*H04N 21/242* (2011.01)
*H04N 21/258* (2011.01)
*H04N 21/6587* (2011.01)
*H04L 29/08* (2006.01)

(52) U.S. Cl.
CPC .... *H04L 29/06496* (2013.01); *H04L 29/06517* (2013.01); *H04L 65/1089* (2013.01); *H04L 65/604* (2013.01); *H04L 65/80* (2013.01); *H04L 67/18* (2013.01); *H04N 21/2368* (2013.01); *H04N 21/234345* (2013.01); *H04N 21/242* (2013.01); *H04N 21/25825* (2013.01); *H04N 21/6587* (2013.01)

(58) Field of Classification Search
None
See application file for complete search history.

(56) References Cited

U.S. PATENT DOCUMENTS

| 7,512,698 | B1 | 3/2009 | Pawson | |
|---|---|---|---|---|
| 7,627,886 | B2 | 12/2009 | Barbanson et al. | |
| 8,127,036 | B2 * | 2/2012 | Abdo et al. | 709/231 |
| 8,583,817 | B2 | 11/2013 | Dolph | |
| 2002/0133247 | A1 * | 9/2002 | Smith et al. | 700/94 |

(Continued)

OTHER PUBLICATIONS

Notice of Allowance (Mail Date Jul. 3, 2013) for U.S. Appl. No. 12/985,372, filed Jan. 6, 2011, First Named Inventor Blaine H. Dolph.

(Continued)

*Primary Examiner* — Andrew Nalven
*Assistant Examiner* — Christopher Ruprecht
(74) *Attorney, Agent, or Firm* — Schmeiser, Olsen & Watts, LLP; Matthew Chung (57) ABSTRACT

A system and associated method for minimizing network traffic in playing a media stream with a media module running in a client computer system. The media stream is stored in a media content server. A video file of the media stream is processed to generate an audio file corresponding to the video file, such that the media module downloads and plays the audio file when the media module is invisible on a computer screen of the client computer system. When the media module becomes visible, the media module switches back to downloading and playing the video file. A current location is tracked by a location sync file stored in the media content server to synchronize the video file and the audio file.

16 Claims, 3 Drawing Sheets

(56) References Cited

U.S. PATENT DOCUMENTS

| | | | |
|---|---|---|---|
| 2006/0136421 A1* | 6/2006 | Muthukrishnan et al. | 707/10 |
| 2006/0174025 A1* | 8/2006 | LaRue et al. | 709/231 |
| 2008/0155437 A1* | 6/2008 | Morris | 715/765 |
| 2008/0250319 A1* | 10/2008 | Lee et al. | 715/716 |
| 2009/0234938 A1* | 9/2009 | Amsterdam et al. | 709/221 |
| 2009/0235318 A1* | 9/2009 | Amsterdam et al. | 725/87 |
| 2010/0011301 A1 | 1/2010 | Binyamin | |
| 2010/0057928 A1* | 3/2010 | Kapoor et al. | 709/231 |
| 2010/0299445 A1* | 11/2010 | Amsterdam et al. | 709/231 |
| 2011/0066673 A1* | 3/2011 | Outlaw | 709/203 |
| 2011/0176790 A1* | 7/2011 | Morris | 386/299 |
| 2011/0191677 A1* | 8/2011 | Morris | 715/716 |

OTHER PUBLICATIONS

Response (Filed Apr. 1, 2013) for U.S. Appl. No. 12/985,372, filed Jan. 6, 2011, First Named Inventor Blaine H. Dolph.

Office Action (Mail Date Jan. 7, 2013) for U.S. Appl. No. 12/985,372, filed Jan. 6, 2011, First Named Inventor Blaine H. Dolph.

* cited by examiner

MEDIA STREAMING

This application is a continuation application claiming priority to Ser. No. 12/985,372, filed Jan. 6, 2011, now U.S. Pat. No. 8,583,817, issued Nov. 12, 2013.

BACKGROUND

Conventional multimedia streaming does not take viewing behavior of a user into account in streaming multimedia data, and consequently unnecessary data traffic is generated at cost.

BRIEF SUMMARY

According to one embodiment of the present invention, a method for minimizing network traffic in playing a media stream with a media module running in a client computer system comprises: identifying by the media module the media stream to play on the client computer system, wherein the media stream is selected from the group consisting of a video file of the media stream and an audio file of the media stream, wherein a media content server coupled to the client computer system via a network stores the video file, the audio file, and a location sync file, the audio file corresponding to the video file, the location sync file comprising a pointer tracking play time of both the video file and the audio file in the media module; downloading the identified media stream from the media content server in the amount of a predefined buffer size of the media module and subsequently playing the downloaded media stream, wherein the predefined buffer size of the media module is significantly less than the size of the video file, wherein the pointer of the location sync file points to a current location of the media stream from said playing; and receiving a notification indicating that visibility of the media module on a computer screen of the client computer system is changed while playing the downloaded media stream, wherein the notification is selected from the group consisting of a first notification and a second notification, wherein the first notification indicates that the media module becomes invisible from the computer screen, and wherein the second notification indicates that the media module becomes visible on the computer screen.

According to one embodiment of the present invention, a computer program product comprises a computer readable memory unit that embodies a computer readable program code. The computer readable program code contains instructions that, when run by a processor of a computer system, implement a method for minimizing network traffic in playing a media stream with a media module running in a client computer system.

According to one embodiment of the present invention, a computer system comprises a processor, a memory coupled to the processor, and a computer readable storage device coupled to the processor, said storage device containing program code configured to be executed by the processor via the memory to implement a method for minimizing network traffic in playing a media stream with a media module running in a client computer system.

According to one embodiment of the present invention, a process for supporting computer infrastructure, said process comprising providing at least one support service for at least one of creating, integrating, hosting, maintaining, and deploying computer-readable code in a computing system, wherein the code in combination with the computing system is capable of performing a method for minimizing network traffic in playing a media stream with a media module running in a client computer system.

DETAILED DESCRIPTION

Figure 1:
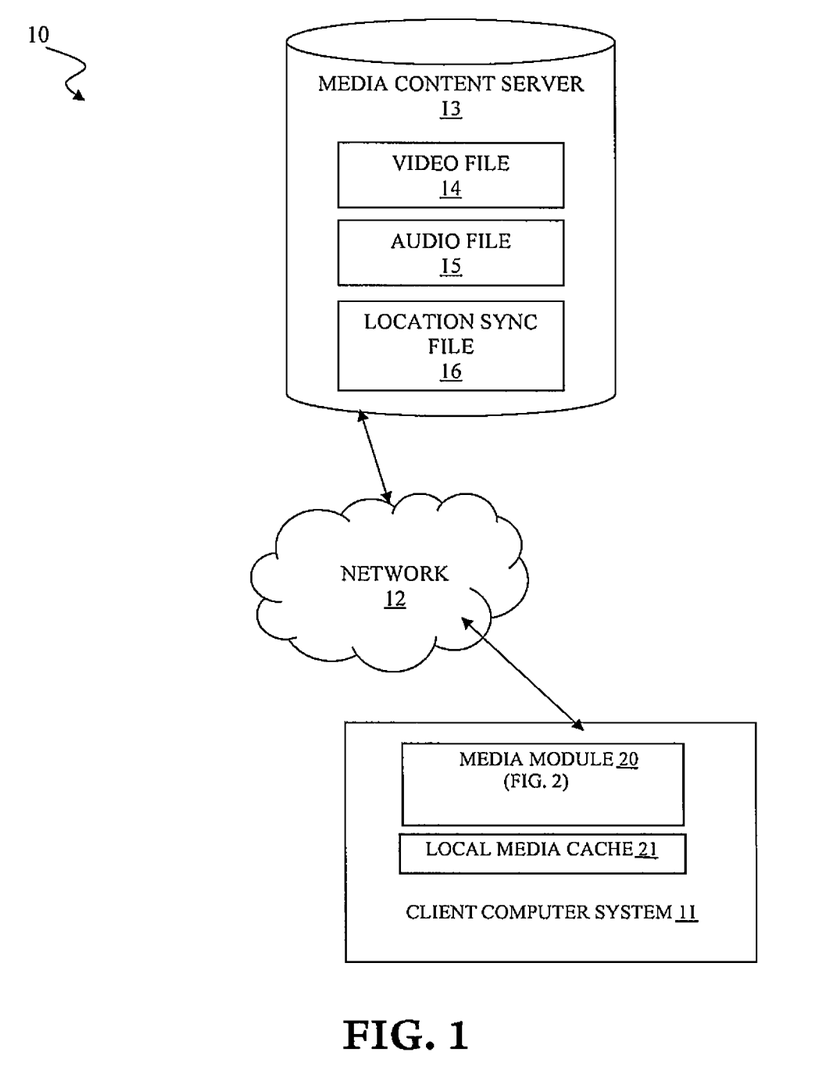
FIG. 1 illustrates a system for minimizing data traffic in multimedia streaming, in accordance with embodiments of the present invention.

FIG. 1 illustrates a system 10 for minimizing data traffic in multimedia streaming, in accordance with embodiments of the present invention.

The system 10 comprises a client computer system 11 and a media content server 13 coupled through a network 12. The network 12 is a digital communication network for long distance data traffic such as Internet.

The media content server 13 comprises a video file 14, an audio file 15, and a location sync file 16. The video file 14 comprises motion pictures and an audio stream. In this specification, the term media stream is used to indicate the video file, the audio stream, or a live broadcast on-line stream. The audio file 15 consists of the audio stream of the video file 14 without the motion pictures. The location sync file 16 has a pair of pointers to track play time of the video file 14 and the audio file 15, respectively, to synchronize the video file 14 and the audio file 15 while playing the media stream. The media content server 13 preprocesses the video file 14 to generate the audio file 15 and the location sync file 16. Even though the audio file 15 and the location sync file 16 uses extra storage space, a fixed cost of extra storage space used for the audio file 15 and the location sync file 16 is less than wasted network bandwidth cost in transferring the video file 14 when invisible, and minimizing data traffic by using extra storage is more cost-effective for media streaming scenarios.

The video file 14 may not be associated with the audio file 15 and the location sync file 16 wherein there is no video file 14 because the media stream is played directly from a live broadcast on-line stream and has not been previously processed for the bandwidth usage minimization of the present invention. Examples of the media content server 13 may be, inter alia, YouTube, Vimeo, Skype®, CNN.com, etc. (YouTube is a trademark of YouTube LLC., in the United States and/or other countries; Vimeo is a trademark of Vimeo LLC., in the United States and/or other countries; Skype is a registered trademark of Skype Limited, in the United States and/or other countries; and Cable News Network (CNN) is a trademark of Turner Broadcasting System, Inc., in the United States and/or other countries)

The client computer system 11 comprises a media module 20 and a local media cache 21. The media module 20 downloads the media stream from the media content server 13 and plays the downloaded media stream. A local media cache of the client computer system 11 buffers the downloaded media stream ahead of play time according to predefined buffering configuration. The buffer size is optimized to reduce the amount of pre-downloaded media stream such that the media module 20 switches downloading from the video file 14 to the audio file 15 to reduce the amount of downloaded media data when the media module 20 becomes invisible on a computer screen of the client computer system 11. See descriptions of FIG. 2, infra, for steps performed by the media module 20.

In this embodiment, the system 10 significantly reduces wasted data traffic based on the swapping of the video file 14 with the audio file 15 when the media module 20 becomes invisible. Typically, a video file is much larger than an audio file for same play time, depending on quality/fidelity of the media, and downloading audio files instead of video files requires a lot less network bandwidth. Accordingly, the network 12 is operated more efficiently with less wasted data traffic and cost incurred by the client computer system 11 for downloading media streams from the media content server 13 can be reduced.

Figure 2:
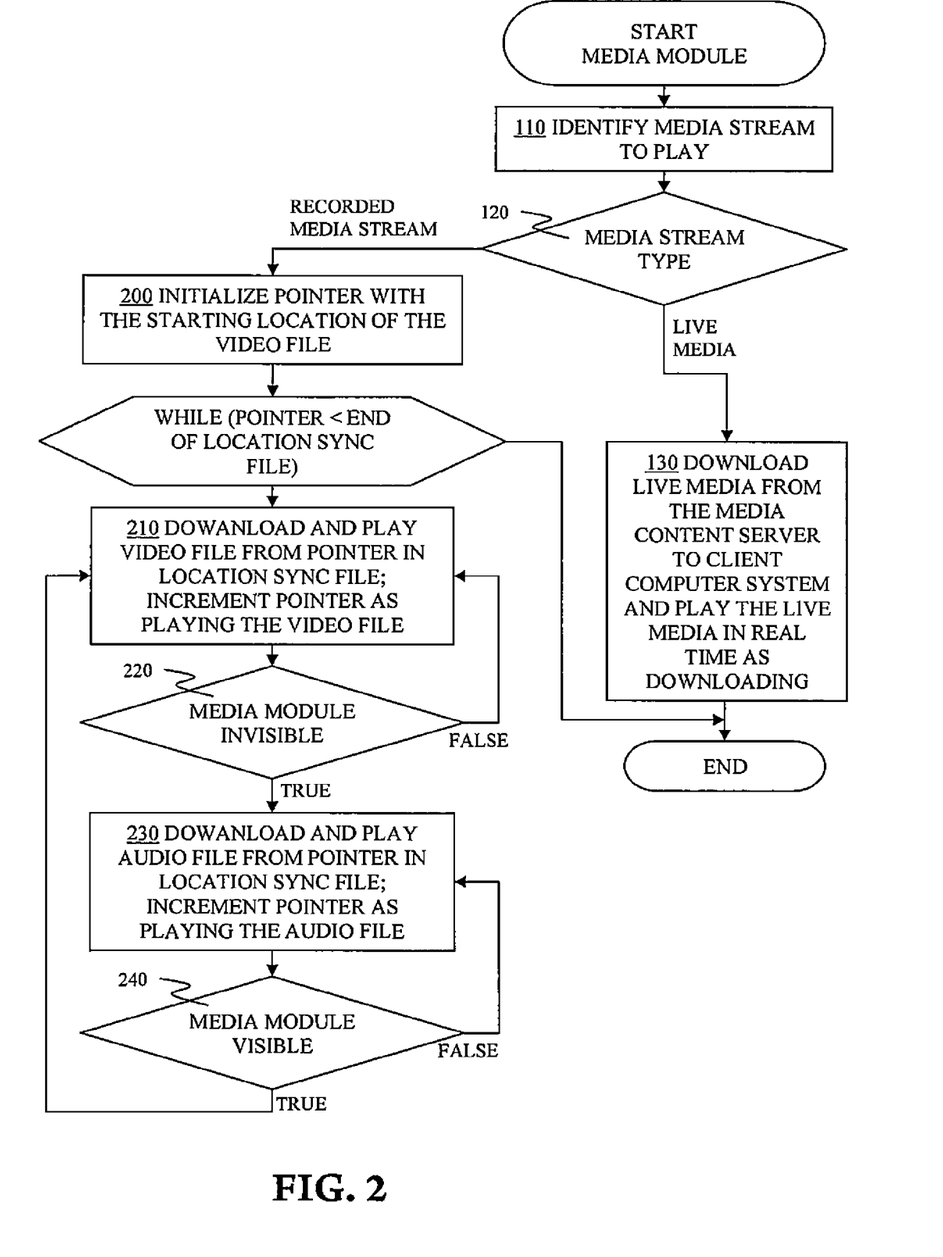
FIG. 2 is a flowchart depicting a method for minimizing data traffic in multimedia streaming, as performed by a media module of FIG. 1, in accordance with the embodiments of the present invention.

FIG. 2 is a flowchart depicting a method for minimizing data traffic in multimedia streaming, as performed by a media module of FIG. 1 supra, in accordance with the embodiments of the present invention.

In step 110, the media module identifies a media stream to play. Then the media module proceeds with step 120.

In step 120, the media module determines a type of the media stream to play in step 110 supra. If the media module determines that the media stream to play is a live broadcast stream that has not been previously processed to generate an audio file associated with the media stream, then the media module proceeds with step 130. If the media module determines that the media stream to play is a recorded video file from the media content server, which has a corresponding audio file, then the media module proceeds with step 200.

In step 130, the media module downloads the live video stream to the local media cache of the client system and plays the downloaded live video stream. The buffer size for the downloading before playing is configured according to the requirements of the client system and the need to minimize the network traffic in anticipation of the media module becomes invisible. Then the media module terminates processing the media stream identified in step 110 and loops back to step 110 to wait for the user to identify a new media stream to play.

In step 200, the media module initializes a pointer with the starting location of the video file that has been identified in step 110 supra. Then the media module proceeds with step 210.

The media module performs steps 210 through 240 while the pointer value is less than the end location of the location sync file. The pointer values increments in steps 210 and 230 as playing the media stream, and upon the pointer value becoming identical to the end location of the location sync file, the media module terminates playing the media stream and loops back to step 110 to wait for the user to identify a new media stream to play.

In step 210, the media module downloads and plays the video file from a location of the pointer value in the location sync file and increments the pointer value as playing the video file. The buffer size for downloaded video file shall be configured to the minimum such that the media module do not waste bandwidth in downloading unwatched video file, in anticipation of the media module becoming invisible from the computer screen of the client computer system. The media module performs step 210 while the media module stays visible. Then the media module proceeds with step 220.

In step 220, the media module receives a first signal indicating that the media module becomes invisible because another window overlaps the window of the media module or because the media module is minimized by the user. The signal is from the client computer system, as an exception or an interrupt. Then the media module proceeds with step 230.

In step 230, the media module downloads and plays the audio file from a location of the pointer value in the location sync file and increments the pointer value as playing the audio file. For example, if the video file has been played for 20 seconds when the media module becomes invisible, the audio file starts at a location 20 seconds where the video file stopped being played. The media module performs step 230 while the media module stays invisible. Then the media module proceeds with step 240.

In step 240, the media module receives a second signal indicating that the media module becomes visible again because the window of the media module is laid on the top of the computer screen in the client computer system. Then the media module proceeds with step 210 supra to play the video file again.

Figure 3:
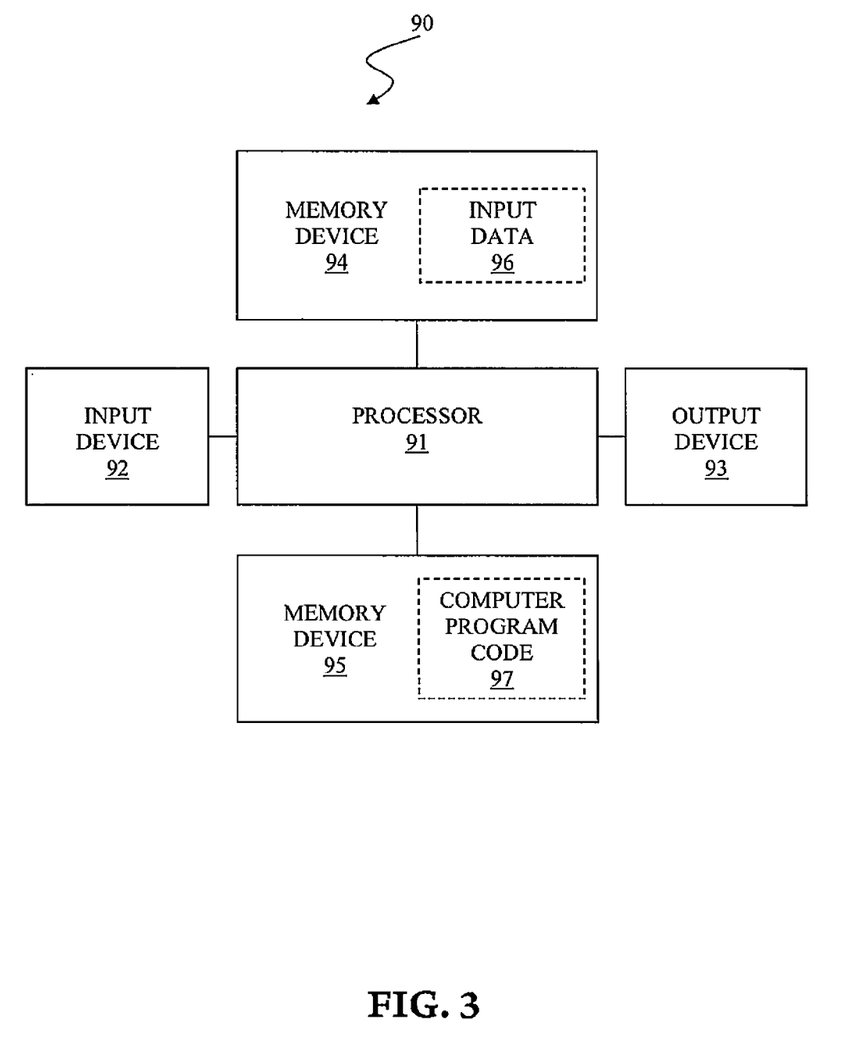
FIG. 3 illustrates a computer system used for minimizing data traffic in multimedia streaming, in accordance with the embodiments of the present invention.

FIG. 3 illustrates a computer system 90 used for minimizing data traffic in multimedia streaming, in accordance with the embodiments of the present invention.

The computer system 90 comprises a processor 91, an input device 92 coupled to the processor 91, an output device 93 coupled to the processor 91, and memory devices 94 and 95 each coupled to the processor 91. In this specification, the computer system 90 represents any type of programmable data processing apparatus.

The input device 92 is utilized to receive input data 96 into the computer system 90. The input device 92 may be, inter alia, a keyboard, a mouse, a keypad, a touch screen, a scanner, a voice recognition device, a sensor, a network interface card (NIC), a Voice/video over Internet Protocol (VOIP) adapter, a wireless adapter, a telephone adapter, a dedicated circuit adapter, etc. The output device 93 is utilized to communicate results generated by the computer program code 97 to a user of the computer system 90. The output device 93 may be, inter alia, a printer, a plotter, a computer screen, a magnetic tape, a removable hard disk, a floppy disk, a NIC, a VOIP adapter, a wireless adapter, a telephone adapter, a dedicated circuit adapter, an audio and/or visual signal generator, a light emitting diode (LED), etc.

Any of the components of the present invention can be deployed, managed, serviced, etc. by a service provider that offers to deploy or integrate computing infrastructure with respect to a process for minimizing data traffic in multimedia streaming of the present invention. Thus, the present invention discloses a process for supporting computer infrastructure, comprising integrating, hosting, maintaining and deploying computer-readable code into a computing system (e.g., computing system 90), wherein the code in combination with the computing system is capable of performing a method for minimizing data traffic in multimedia streaming.

In another embodiment, the invention provides a business method that performs the process steps of the invention on a subscription, advertising and/or fee basis. That is, a service provider, such as a Solution Integrator, can offer to create, maintain, support, etc., a process for minimizing data traffic in multimedia streaming of the present invention. In this case, the service provider can create, maintain, support, etc. a computer infrastructure that performs the process steps of the invention for one or more customers. In return, the service provider can receive payment from the customer(s) under a subscription and/or fee agreement, and/or the service provider can receive payment from the sale of advertising content to one or more third parties.

While FIG. 3 shows the computer system 90 as a particular configuration of hardware and software, any configuration of hardware and software, as would be known to a person of ordinary skill in the art, may be utilized for the purposes stated supra in conjunction with the particular computer system 90 of FIG. 3. For example, the memory devices 94 and 95 may be portions of a single memory device rather than separate memory devices.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. In this specification, the term "memory device" 94, 95 represent a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code 97 for carrying out operations for aspects of the present invention may be written in any combination of one or more programming languages, including an object oriented programming language such as Java, Smalltalk, C++ or the like and conventional procedural programming languages, such as the "C" programming language or similar programming languages. The computer program code 97 may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. The term "computer program instructions" is interchangeable with the term "computer program code" 97 in this specification. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable storage medium that can direct a computer, other programmable data processing apparatus, or other devices to function in a particular manner, such that the instructions stored in the computer readable storage medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The corresponding structures, materials, acts, and equivalents of all means or step plus function elements in the claims are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for playing a media stream with a media module running in a computer system, said method comprising:
   downloading, by the media module via a processor of the computer system, the media stream, wherein the media stream comprises a video file, an audio file, or both the video file and the audio file, wherein the video file comprises motion pictures and an associated first audio stream, wherein the audio file comprises a second audio stream identical to the first audio stream, and wherein a media content server coupled to the computer system stores the video file and the audio file;
   playing, by the media module via the processor, the downloaded media stream while the media stream continues to be downloaded, wherein if the media stream comprises the video file then said playing comprises playing both the motion pictures and the associated first audio stream, and wherein if the media stream comprises the audio file then said playing comprises playing the second audio stream; and
   receiving, by the media module via the processor during said playing while the media stream continues to be downloaded, a first notification indicating that visibility of the media module on a computer screen of the computer system is changed during said playing the downloaded media stream while the media stream continues to be downloaded wherein the first notification indicates that the media module becomes invisible on the computer screen from being visible on the computer screen; wherein the media stream comprises the video file;
   when the media module becomes invisible on the computer screen from being visible on the computer screen, said media module via the processor:
      stopping said downloading of the video file from the media content server and stopping said playing of the video file in the computer system; and
      starting downloading the audio file from the media content server from a current location of the media stream and playing the downloaded audio file in the computer system while the audio file continues to be downloaded.

2. The method of claim 1, wherein the media content server further stores a location sync file that comprises a pointer tracking play time of both the video file and the audio file in the media module, and wherein the pointer of the location sync file points to the current location of the media stream from said playing.

3. The method of claim 2,
   wherein the current location is directed by the pointer of the location sync file.

4. The method of claim 1, said method further comprising:
   receiving, by the media module via the processor during said playing while the media stream continues to be downloaded, a second notification indicating that visibility of the media module on a computer screen of the computer system is changed during said playing the downloaded media stream while the media stream continues to be downloaded, wherein the second notification indicates that the media module becomes visible on the computer screen from being invisible on the computer screen, wherein the media stream comprises the audio file;
   when the media module becomes visible on the computer screen from being invisible on the computer screen, said media module via the processor:
      stopping said downloading of the audio file from the media content server and stopping said playing of the audio file in the computer system; and
      starting downloading the video file from the media content server from the current location of the media stream and playing the downloaded video file in the computer system while the video file continues to be downloaded.

5. The method of claim 2, said method further comprising:
   determining, by the media module via the processor, that the pointer of the location sync file reaches to the end of the audio file while playing the audio file; and
   stopping, by the media module via the processor, said downloading of the audio file from the media content server and stopping, by the media module via the processor, said playing of the audio file in the computer system.

6. The method of claim 1, said method further comprising:
   providing at least one support service for at least one of creating, integrating, hosting, maintaining, and deploying computer-readable program code in the computer system, said program code being executed by the processor to implement said downloading, said playing, and said receiving.

7. A computer program product comprising:
   a computer readable hardware storage device having a computer readable program code embodied therein, said computer readable program code containing instructions that, upon being executed by a processor of a computer system, implement a method for playing a media stream with a media module running in a computer system, said method comprising:
   downloading, by the media module via the processor, the media stream, wherein the media stream comprises a video file, an audio file, or both the video file and the audio file, wherein the video file comprises motion pictures and an associated first audio stream, wherein the audio file comprises a second audio stream identical to the first audio stream, and wherein a media content server coupled to the computer system stores the video file and the audio file;
   playing, by the media module via the processor, the downloaded media stream while the media stream continues to be downloaded, wherein if the media stream comprises the video file then said playing comprises playing both the motion pictures and the associated first audio stream, and wherein if the media stream comprises the audio file then said playing comprises playing the second audio stream; and
   receiving, by the media module via the processor during said playing while the media stream continues to be downloaded, a first notification indicating that visibility of the media module on a computer screen of the computer system is changed during said playing the downloaded media stream while the media stream continues to be downloaded, wherein the first notification indicates that the media module becomes invisible on the computer screen from being visible on the computer screen, wherein the media stream comprises the video file;

when the media module becomes invisible on the computer screen from being visible on the computer screen, said media module via the processor:

stopping said downloading of the video file from the media content server and stopping said playing of the video file in the computer system, and starting downloading the audio file from the media content server from a current location of the media stream and playing the downloaded audio file in the computer system while the audio file continues to be downloaded.

8. The computer program product of claim 7, wherein the media content server further stores a location sync file that comprises a pointer tracking play time of both the video file and the audio file in the media module, and wherein the pointer of the location sync file points to the current location of the media stream from said playing.

9. The computer program product of claim 8,
wherein the current location is directed by the pointer of the location sync file.

10. The computer program product of claim 7, said method further comprising:

receiving, by the media module via the processor during said playing while the media stream continues to be downloaded, a second notification indicating that visibility of the media module on a computer screen of the computer system is changed during said playing the downloaded media stream while the media stream continues to be downloaded, wherein the second notification indicates that the media module becomes visible on the computer screen from being invisible on the computer screen, wherein the media stream comprises the audio file;

when the media module becomes visible on the computer screen from being invisible on the computer screen, said media module via the processor:

stopping said downloading of the audio file from the media content server and stopping said playing of the audio file in the computer system; and starting downloading the video file from the media content server from the current location of the media stream and playing the downloaded video file in the computer system while the video file continues to be downloaded.

11. The computer program product of claim 8, said method further comprising:

determining, by the media module via the processor, that the pointer of the location sync file reaches to the end of the audio file while playing the audio file; and stopping, by the media module via the processor, said downloading of the audio file from the media content server and stopping, by the media module via the processor, said playing of the audio file in the computer system.

12. A computer system comprising a processor, a memory coupled to the processor, and a computer readable storage device coupled to the processor, said storage device containing program code configured to be executed by the processor via the memory to implement a method for playing a media stream with a media module running in a computer system, said method comprising:

downloading, by the media module via the processor, the media stream, wherein the media stream comprises a video file, an audio file, or both the video file and the audio file, wherein the video file comprises motion pictures and an associated first audio stream, wherein the audio file comprises a second audio stream identical to the first audio stream, and wherein a media content server coupled to the computer system stores the video file and the audio file;

playing, by the media module via the processor, the downloaded media stream while the media stream continues to be downloaded, wherein if the media stream comprises the video file then said playing comprises playing both the motion pictures and the associated first audio stream, and wherein if the media stream comprises the audio file then said playing comprises playing the second audio stream; and receiving, by the media module via the processor during said playing while the media stream continues to be downloaded, a first notification indicating that visibility of the media module on a computer screen of the computer system is changed during said playing the downloaded media stream while the media stream continues to be downloaded, wherein the first notification indicates that the media module becomes invisible on the computer screen from being visible on the computer screen, wherein the media stream comprises the video file;

when the media module becomes invisible on the computer screen from being visible on the computer screen, said media module via the processor:

stopping said downloading of the video file from the media content server and stopping said playing of the video file in the computer system; and starting downloading the audio file from the media content server from a current location of the media stream and playing the downloaded audio file in the computer system while the audio file continues to be downloaded.

13. The computer system of claim 12, wherein the media content server further stores a location sync file that comprises a pointer tracking play time of both the video file and the audio file in the media module, and wherein the pointer of the location sync file points to the current location of the media stream from said playing.

14. The computer system of claim 13,
wherein the current location is directed by the pointer of the location sync file.

15. The computer system of claim 12, said method further comprising:

receiving, by the media module via the processor during said playing while the media stream continues to be downloaded, a second notification indicating that visibility of the media module on a computer screen of the computer system is changed during said playing the downloaded media stream while the media stream continues to be downloaded, wherein the second notification indicates that the media module becomes visible on the computer screen from being invisible on the computer screen, wherein the media stream comprises the audio file;

when the media module becomes visible on the computer screen from being invisible on the computer screen, said media module via the processor:

stopping said downloading of the audio file from the media content server and stopping said playing of the audio file in the computer system; and starting downloading the video file from the media content server from the current location of the media stream and playing the downloaded video file in the computer system while the video file continues to be downloaded.

16. The computer system of claim 13, said method further comprising:

determining, by the media module via the processor, that the pointer of the location sync file reaches to the end of the audio file while playing the audio file; and stopping, by the media module via the processor, said downloading of the audio file from the media content server and stopping, by the media module via the processor, said playing of the audio file in the computer system.

\* \* \* \* \*